Figure 1:
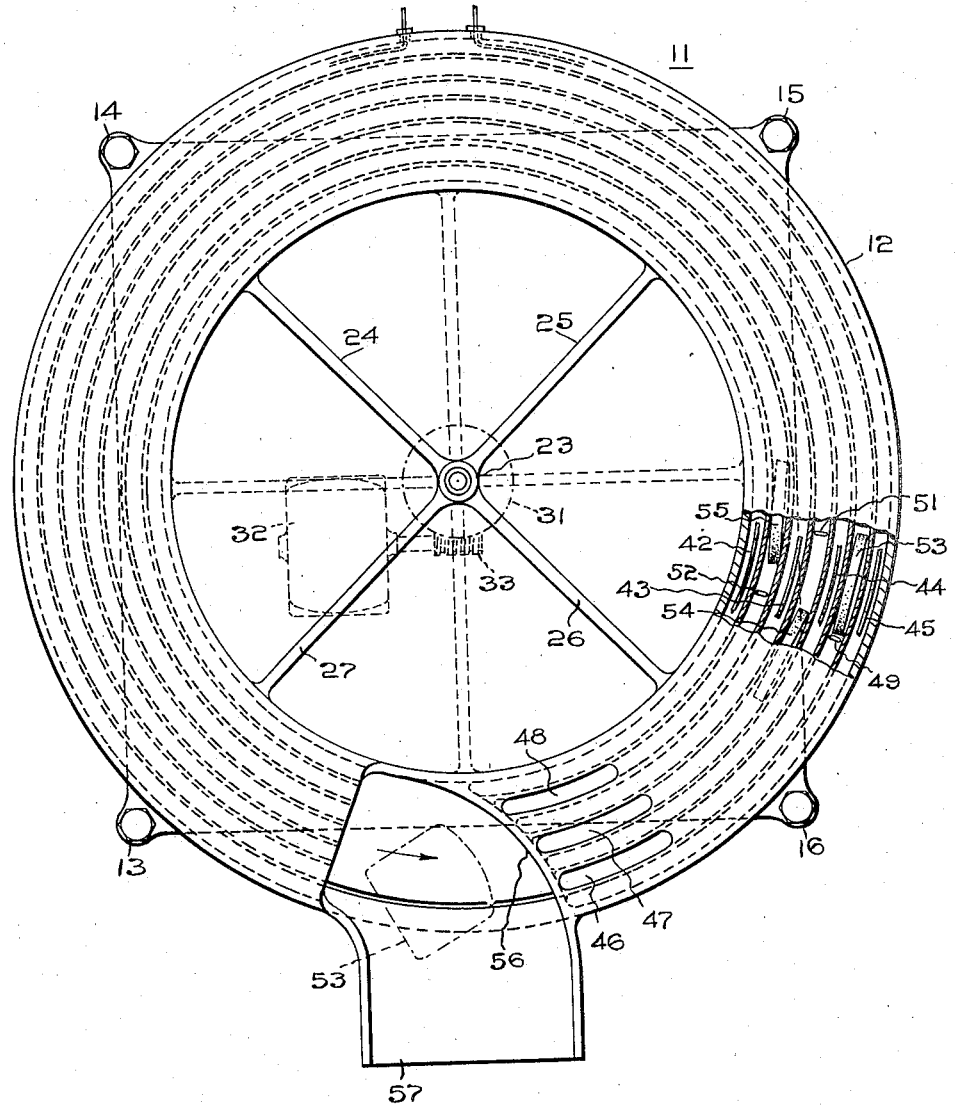

Jan. 27, 1925. 1,524,532
H. M. BIEBEL
AUTOMATIC TOASTER
Filed Feb. 20, 1924  2 Sheets-Sheet 2
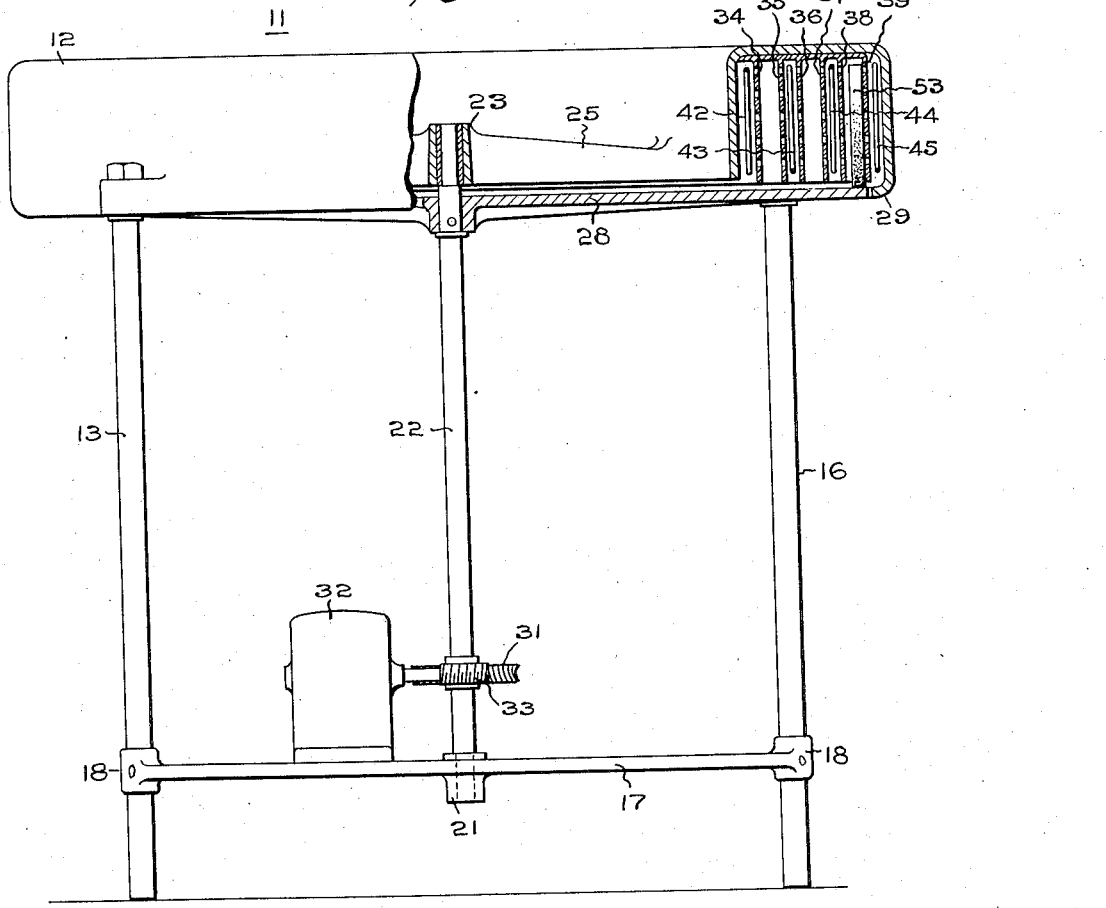
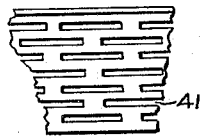
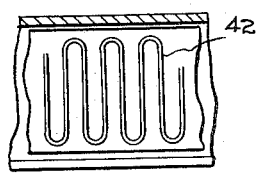
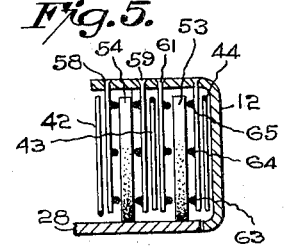
WITNESSES:
R. S. Harrison
R. J. Fitzgerald
INVENTOR
Herman M. Biebel
BY
Wesley G. Carr
ATTORNEY Jan. 27, 1925.

H. M. BIEBEL

AUTOMATIC TOASTER

Filed Feb. 20, 1924

1,524,532

2 Sheets-Sheet 1

WITNESSES:

INVENTOR
Herman M. Biebel
BY
ATTORNEY

Patented Jan. 27, 1925.

1,524,532

UNITED STATES PATENT OFFICE.

HERMAN M. BIEBEL, OF OAKMONT, PENNSYLVANIA, ASSIGNOR TO WESTINGHOUSE ELECTRIC & MANUFACTURING COMPANY, A CORPORATION OF PENNSYLVANIA.

AUTOMATIC TOASTER.

Application filed February 20, 1924. Serial No. 694,024.

*To all whom it may concern:*

Be it known that I, HERMAN M. BIEBEL, a citizen of the United States, and a resident of Oakmont, in the county of Allegheny and State of Pennsylvania, have invented a new and useful Improvement in Automatic Toasters, of which the following is a specification.

My invention relates to electric cooking devices and particularly to electric toasters of the automatic type.

The object of my invention is to provide a relatively simple and compact electric toaster that shall permit of the simultaneous toasting and delivery of a plurality of toasted slices of bread.

In practicing my invention, I provide a motor driven shaft supporting a horizontal annular table. An open-bottom casing, of annular form, is located above the table and has mounted therein a plurality of extended, concentric, annular, electric heating elements, and a plurality of annular paths therebetween. The casing is provided with a plurality of openings to permit of the simultaneous insertion of a plurality of slices of bread therein and in the respective paths in the casing, and means integral with the casing to co-operate with the rotatable table to remove the toast therefrom.

In the drawings,

Figure 1 is a top plan view, with a portion of the casing cut away, of a device embodying my invention, Fig. 2 is a view, partially in side elevation and partially in section, of the device of Fig. 1, Fig. 3 is a fragmentary view, partially in side elevation and partially in vertical section, of an electric heating element comprising a part of my invention, Fig. 4 is a fragmentary view, in side elevation, of means comprising a path within the casing, and Fig. 5 is a fragmentary view, in vertical section, of a modified form of casing comprising a part of my invention.

A toaster mechanism, designated generally by the numeral 11 comprises an open-bottom casing 12, of substantially annular form that may be of a suitable metal. A supporting structure therefor, comprises a plurality of spaced, vertically-extending rods 13, 14, 15 and 16, that are bolted to suitable lugs integral with the outer peripheral portion of the casing 12. A bottom plate 17 is provided and has enlarged lug portions designated generally by the numeral 18, in Figs. 2 of the drawings, through which the respective supporting rods 13 to 16, inclusive, may extend. While I have illustrated a particular construction of supporting means, I do not desire to be limited thereto, as this forms no particular part of my invention.

The supporting plate 17 is provided with a substantially central bearing member 21 that may be constructed as a thrust bearing to support a vertically extending shaft 22, the upper end of which is disposed in a suitable bearing member 23, that is connected with the inner peripheral surface of the casing 12 by radially extending arms 24, 25, 26 and 27. A revoluble table 28 is mounted on the shaft 22 immediately beneath the bearing member 23 and extends to within a small distance of the inturned flange 29 of the bottom portion of the casing 12, substantially as is illustrated at the right hand side of Fig. 2 of the drawings.

Means for causing a turning movement of the shaft 22 and a revoluble movement of the table 28 comprises a worm wheel 31 that is suitably secured to the shaft 22 above the base plate 17. An electric motor 32 is mounted on the base plate 17 and carries a worm 33 on the outer end of its projecting shaft, the worm operatively engaging the worm wheel 31. The motor 32 may be of any suitable or desired type, and is preferably made adjustable in speed in order to vary the time within which the table 28 makes a complete rotation.

I have not illustrated a specific construction of worm and worm wheel, as these are old in the art and any suitable type may be employed. The main object of this part of the device is to provide motor-operated means for effecting a relatively slow rotative movement of the table 28.

Within the casing 12 are provided a plurality of annular concentric members 34, 35, 36, 37, 38, and 39, adjacent pairs of which co-operate to form substantially annular paths within the casing 12, through which slices of bread to be toasted may be moved by the table 28.

As is illustrated more particularly in Fig. 4 of the drawings, the members 34 to 39, inclusive, may comprise relatively thin sheets of metal that have punched-out-portions 41 in order to permit of the transference therethrough of heat from electric heating means provided within the casing. A plurality of electric heating elements 42, 43, 44 and 45 are located within the casing 12 and may be of any suitable or desired construction so long as they provide extended heating elements whereby substantially all of each annular path is heated.

I may provide a heating element of the form illustrated in Fig. 3 of the drawing that is supported by suitable insulating means within the casing 12.

It may be noted that I have provided three annular paths within the casing 12 and have further provided four concentric, extended, annular, electric heating elements whereby both sides of each of the annular paths are heated. The number of annular paths provided will be in accordance with the number of slices of toast that are desired simultaneously to serve as an order and any desired number of paths and of heating elements may be provided.

Means for permitting the simultaneous insertion of a plurality of slices of bread into the casing 12 comprise openings 46, 47 and 48 that are located in adjacent spaced relation in the top of the casing 12 substantially as illustrated in Fig. 1 of the drawing. The openings are located above the respective annular paths provided by the pairs of spaced members 34 to 39, inclusive. A plurality of integral lugs 49, 51 and 52 are provided on the table 28 and located immediately below the annular paths, in order that slices of bread placed in the casing 12 through the openings 46 and 48 may have positive moving means.

The relation of the speed of the table 28 and the amount of heat provided by the respective electric heating elements located within the casing 12 is such that slices of bread will be properly toasted when or after they have been moved through substantially or slightly less than one complete revolution within the casing 12.

Means for removing the toasted slice of bread, designated by the numerals 53, 54 and 55 in Fig. 1 of the drawings, comprises an integral portion 56 of the casing 12 that is of depending and arcuate form and constitutes also a closure for one end of the casing 12.

A support 57 may be provided on the casing 12, and extending radially and horizontally outwardly therefrom, to receive the toasted slice of bread after its movement through the casing.

It is evident that while the slices of bread are moving through the casing, they will be held in substantially operative position on the table 28 by the co-operating pairs of members 34 to 39, inclusive, and be subjected to the heat from the electric heating elements. However, when they have been moved to the open space immediately in front of the arcuate member 56, they will no longer have means for supporting them and will take the position illustrated by the slices 53 in broken lines in Fig. 1, and when they touch the arcuate member 56, will be moved away from the table and onto the member 57, from which the operator may remove them.

In Fig. 5 of the drawings, I have illustrated a modified form of construction of means for providing a plurality of annular paths within the casing 12. I have there illustrated two paths only and two slices of bread 53 and 54, moving therein. I provide a plurality of spaced and depending rods 58, 59, 61 and 62, that are suitably secured, in the top of the casing 12. The rods 58 are located in one circle, and the rods 59, 61 and 62 are respectively located in concentric and larger circles. A plurality of rod or wire members 63, 64 and 65 are secured to the plurality of depending members 62 and extend in a substantially horizontal and circular direction within the casing 12. Substantially similar rods or wires are provided for the other depending rod members 58, 59 and 61, and as they are similar to those already described, will not be described further in detail.

This construction provides a plurality of annular and substantially horizontally-extending rod members between which slices of bread to be toasted may move and as it is not necessary to provide more than two, or possibly three members of rod form, there will be very little friction between the slices of bread and the means constituting the annular paths within which the slices of bread must move.

The device embodying my invention thus provides a motor-operated and electrically-heated means for simultaneously toasting a plurality of slices of bread, which slices of bread are located on a rotatable table and are toasted in less than one complete revolution thereof.

Various modifications and changes may be made without departing from the spirit and scope of the invention. I desire, therefore, that only such limitations shall be placed thereon as are imposed by the prior art.

I claim as my invention:

1. In an electric toaster, in combination, a plurality of concentrically-spaced electric heating elements, and means for moving a plurality of slices of bread simultaneously between said spaced heating elements.

2. In an electric toaster, in combination, a plurality of concentrically-spaced electric heating elements, an open-bottom, annular casing surrounding said heating elements, and a horizontally-extending rotatable table for closing said casing and for moving a plurality of slices of bread between said spaced heating elements.

3. In an electric toaster, in combination, a plurality of concentrically-spaced electric heating elements, means for providing a plurality of concentric annular paths therebetween, and means for simultaneously moving a slice of bread along each of said paths.

4. In an electric toaster, in combination, a plurality of spaced electric heating elements, each of substantially annular form, an open-bottom casing surrounding said heating elements, means for providing a plurality of annular concentric paths between said spaced heating elements in said casing, and a horizontally-extending rotatable table for closing said open bottom and for simultaneously moving a slice of bread along each of said paths.

5. In an electric toaster, in combination, a plurality of spaced electric heating elements, each of substantially annular form, an open-bottom casing surrounding said heating elements, means for providing a plurality of annular concentric paths between said spaced heating elements in said casing, a horizontally-extending rotatable table for closing said open bottom and for simultaneously moving a slice of bread along each of said paths, and means integral with said casing for moving toasted slices of bread out of said annular paths.

6. In an electric toaster, in combination, a plurality of spaced electric heating elements, each of substantially annular form, an open-bottom casing surrounding said heating elements, means for providing a plurality of annular concentric paths between said spaced heating elements in said casing, a horizontally-extending rotatable table for closing said open bottom and for simultaneously moving a slice of bread along each of said paths, and means integral with said casing and co-operating with said rotatable table for moving toasted slices of bread out of said annular paths.

7. In an electric toaster, in combination, a horizontally-extending rotatable table, an annular open bottom casing located above said table, means for providing a plurality of annular concentric paths in said casing, a plurality of electric heating elements located between and on the outside of said annular paths, means in said casing for permitting the simultaneous introduction of a slice of bread into each of said paths and on said table and means integral with said casing and co-operating with said rotatable table for moving toasted slices of bread out of said annular paths and off said table after less than one rotation thereof.

8. In an electric toaster, in combination, a vertically extending shaft, a motor for driving the same, an annular horizontally-extending table supported by said shaft, an open bottom casing located above said table, a plurality of spaced, extended, annular concentric heating elements in said casing, a plurality of concentric annular paths in said casing located between said heating elements, means in said casing for permitting the simultaneous introduction of a slice of bread into each of said paths and on said table, and means integral with said casing and co-operating with said table for moving toasted slices of bread out of said annular paths and off said table after less than one rotation thereof.

In testimony whereof, I have hereunto subscribed my name this 8th day of February, 1924.

HERMAN M. BIEBEL.